(12) United States Patent
Sasa et al.

(10) Patent No.: US 6,333,592 B1
(45) Date of Patent: Dec. 25, 2001

(54) FILTER FOR PLASMA DISPLAY PANEL

(75) Inventors: Kazuaki Sasa; Toshitaka Nakamura, both of Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 09/404,709

(22) Filed: Sep. 24, 1999

(30) Foreign Application Priority Data

Sep. 28, 1998 (JP) .................................................. 10-273043

(51) Int. Cl.$^7$ ........................................................ H01J 5/16
(52) U.S. Cl. ............................................. 313/112; 313/110
(58) Field of Search ................................... 313/110, 112, 313/479, 580; 359/359

(56) References Cited

U.S. PATENT DOCUMENTS

| | | |
|---|---|---|
| 4,234,654 | 11/1980 | Yatabe et al. . |
| 4,859,532 | 8/1989 | Oyama et al. ........................ 428/336 |
| 5,071,206 | 12/1991 | Hood et al. ........................... 359/360 |

FOREIGN PATENT DOCUMENTS

| | | |
|---|---|---|
| 0 698 585 A1 | 2/1996 | (EP) . |
| 0 810 452 A2 | 12/1997 | (EP) . |
| 10-217380 | 8/1998 | (JP) . |
| 10-264287 | 10/1998 | (JP) . |

*Primary Examiner*—Vip Patel
(74) *Attorney, Agent, or Firm*—McGinn & Gibb,PLLC (57) ABSTRACT

A filter for a plasma display panel wherein the filter has a laminated body, as a constituent element, in which n units ($3 \leq n \leq 10$) each consisting of a metallic oxide film and a silver transparent electric-conductor film are successively laminated unit after unit on a surface of a transparent film base, and a metallic oxide film is formed on the units as an outermost layer of the laminated body, each metallic oxide film having optical transparency of a refractive index of 1.5 to 2.7, each silver transparent electric-conductor film having a thickness set substantially to a fixed value in a range of from 5 to 20 nm, each of the metallic oxide film put directly on the surface of the base and the outermost-layer metallic oxide film having a thickness $5/2$ ($1\pm0.15$) times as large as the thickness of each silver transparent electric-conductor film, each of the other metallic oxide films located halfway between the metallic oxide film put directly on the surface of the base and the outermost-layer metallic oxide film having a thickness 5 ($1\pm0.15$) times as large as the thickness of each silver transparent electric-conductor film.

11 Claims, 4 Drawing Sheets

FILTER FOR PLASMA DISPLAY PANEL

BACKGROUND OF THE INVENTION

1. Field of the Invention

The present invention relates to a filter for a plasma display panel (hereinafter abbreviated to 'PDP') disposed on the front surface of a PDP in order to simultaneously cut electromagnetic waves and near infrared rays generated from the PDP, and a PDP display unit with this filter stuck thereto.

The present application is based on Japanese Patent Applications No. Hei. 10-273043. which is incorporated herein by reference.

2. Description of the Related Art

A PDP is charged with gas mainly consisting of inert gas, particularly neon. In the PDP, electrons discharged from a cathode are accelerated so as to have a collision with gas moleculars and make their way to an anode while being exited or ionized. Positive ions generated in the anode also collide against the cathode so that electrons are emitted so as to commence electrical discharge. At this time, electromagnetic waves and near infrared rays are emitted with the transition procedure of neon atoms.

The emitted near infrared rays have a wavelength in a range of from 850 to 1,200 nm. On the other hand, the light sensitivities of remote controllers for household appliances, KARAOKE equipments, audio/video systems, etc. are in a range of from 700 to 1,300 nm. Therefore, there has arisen a problem that the near infrared rays emitted from the PDP cause erroneous operations in the remote controllers. However, the near infrared rays are generated on the principle of the PDP, and they cannot be prevented in the PDP itself.

Therefore, a filter for cutting electromagnetic waves and near infrared rays generated from the PDP has been investigated. In the background art, for example, there was employed a method in which a plate in which an acrylic sheet with low-resistance metal meshes or etched meshes buried therein and an acrylic sheet mixed with a dye material absorbing near infrared rays are stuck or thermally fused with each other, a plate in which a film including a near infrared ray absorber is stuck to a glass sheet having a silver thin film or the like formed directly by a sputtering process, or a plate in which a sheet having a silver thin film or the like formed by a sputtering process is stuck to an acrylic sheet mixed with a dye material absorbing near infrared rays, is set on the front side of the PDP through an air layer.

The above-mentioned mesh type can obtain a low resistance value, but it has drawbacks that a filter for cutting near infrared rays is necessary otherwise, and a moire phenomenon is produced due to the display pattern intervals of the PDP so that the display quality deteriorates. In the filter produced by a dry process represented by the sputtering process, no moire phenomenon is seen, but there has been no filter which can satisfy at the same time the properties of low resistance, visible light transparency, cutting of near infrared rays of 850 to 1,200 nm, and low visible light reflection, and which can be formed in a comparatively simple laminated configuration. Further, since the filter is set on the front side of the PDP through an air layer in such a method, the visibility is reduced and the features of the PDP, that is, lightness in weight and thinness in thickness, are spoiled.

SUMMARY OF THE INVENTION

It is an object of the present invention to provide a PDP filter which can satisfy at the same time the properties necessary for a PDP such as electromagnetic wave shielding properties, near infrared ray cutting properties, low visible light reflection properties, and so on, in a comparatively simple laminated configuration, and which is superior in visibility, light in weight and thin in thickness. It is another object of the present invention to provide a PDP display unit having this PDP filter.

In order to solve the above problem, according to the present invention, a filter for a plasma display panel is constituted by a laminated body in which n units ($3 \leq n \leq 10$) each consisting of a metallic oxide film and a silver transparent electric-conductor film are successively laminated unit after unit on a surface of a transparent film base, and a metallic oxide film is formed on the units as an outermost layer of the laminated body. Each metallic oxide film has optical transparency of a refractive index of 1.5 to 2.7, and each silver transparent electric-conductor film has a thickness set substantially to a fixed value in a range of from 5 to 20 nm. Each of the metallic oxide film put directly on the surface of the base and the outermost-layer metallic oxide film has a thickness 5/2 ($1 \pm 0.15$) times as large as the thickness of each silver transparent electric-conductor film. Each of the other metallic oxide films located halfway between the metallic oxide film put directly on the surface of the base and the outermost-layer metallic oxide film has a thickness 5 ($1 \pm 0.15$) times as large as the thickness of each silver transparent electric-conductor film.

Further, according to the present invention, when a hard-coat layer is formed on the surface of the outermost metallic oxide film and when the refractive index of the hard coat layer exceeds 1.45, the objects of the present invention can be attained by the laminated body in which an anti-reflection and anti-contamination layer 0.001 to 1 $\mu$m thick is further formed on the hard coat layer. Preferably, the hard coat layer is a coating film having a refractive index of 1.45 or less, a thickness of 0.05 to 10 $\mu$m, and an angle of contact with water of 90° or more.

In another aspect, the objects are attained by the laminated body in which a film in which a hard coat layer, an anti-reflection layer and an anti-contamination layer are formed on one surface of another transparent film base is prepared, and the film is stuck to the surface of the outermost metallic oxide film through a transparent adhesive layer formed on the other surface of the other transparent film base.

Further, in the laminated body, it is preferable that an undercoat layer with a refractivity of 1.5 or less and a thickness of 0.05 to 1 $\mu$m is formed between the surface of the transparent film base and the metallic oxide film provided on the surface of the film base.

Figure 7:
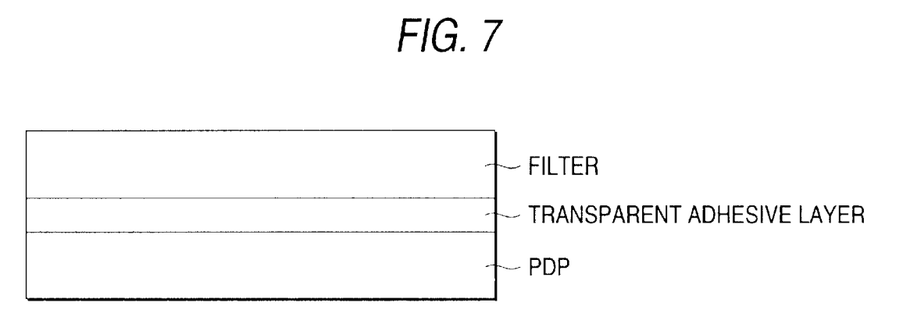
FIG. 7 is a sectional view showing an outline of an embodiment of a plasma display panel display unit according to the present invention.
Figure 8:
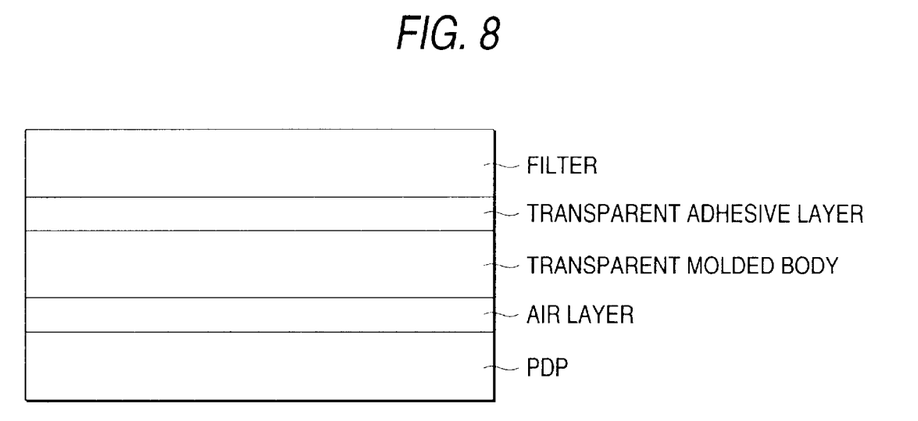
FIG. 8 is a sectional view showing an outline of another embodiment of a plasma display panel display unit according to the present invention.

Further, according to the present invention, the laminated body in which a transparent adhesive layer 10 to 500 $\mu$m thick is formed on the back surface of the transparent film base is stuck to a front display glass portion of a PDP through the transparent adhesive layer (FIG. 7), or the laminated body is stuck, through the transparent adhesive layer, to the other surface side of a transparent molded body which is attached at its on surface side to the front side of a PDP through an air layer (FIG. 8). Thus, the expected objects of electromagnetic wave shielding properties, near infrared ray cutting properties and low visible light reflection properties necessary to a PDP can be attained by a comparatively simple laminated configuration.

In addition, it is also possible to provide a PDP display unit having a PDP front filter which is superior in visibility, light in weight and thin in thickness.

Features and advantages of the invention will become understood from the following detailed description of the preferred embodiments described in conjunction with the attached drawings.

DETAILED DESCRIPTION OF THE PREFERRED EMBODIMENTS

A PDP filter according to the present invention will be specifically described below, with reference to FIGS. 1 and 2.

Figure 1:
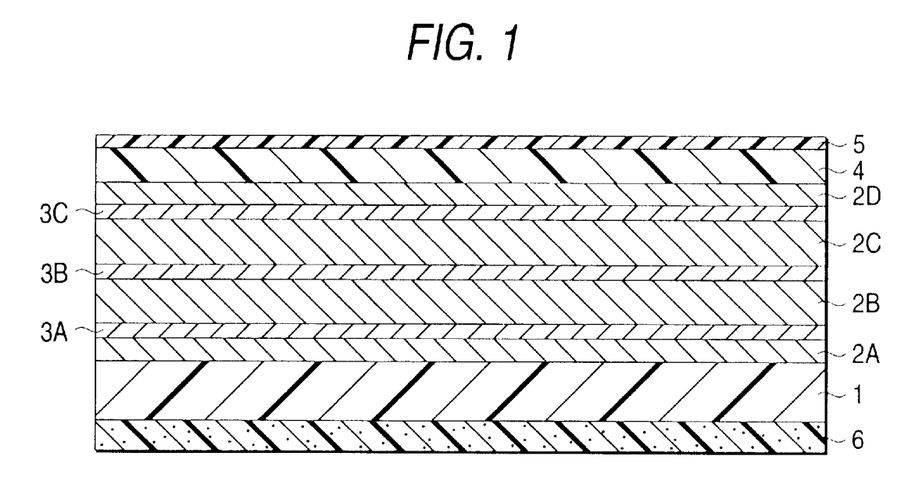
FIG. 1 is a sectional view showing an outline of an embodiment of a plasma display panel filter according to the present invention.

In FIG. 1, metallic oxide films (2A, 2B and 2C) and silver transparent electric-conductor films (3A, 3B and 3C) are successively and alternatively laminated on the surface of a transparent film base 1 (FIG. 1 shows an example of three units) so that every unit is constituted by a metallic oxide film and a silver transparent electric-conductor film, a metallic oxide film 2D being formed in the outermost layer.

Each of the above-mentioned metallic oxide films is a film having optical transparency of a refractive index in a range of from 1.5 to 2.7. The thickness of each silver transparent electric-conductor film is set substantially to a fixed value in a range of from 5 to 20 nm. In addition, design is made so that each of the thickness of the metallic oxide film on the base surface and the thickness of the outermost metallic oxide film (2A, 2D) is 5/2 (1±0.15) times as large as the thickness of each silver transparent electric-conductor film, while the thickness of each of the other metallic oxide films located halfway (2B, 2C) is 5 (1±0.15) times as large as the thickness of each silver transparent electric-conductor film.

FIG. 1 shows an example in which a hard coat layer 4 and an anti-reflection and anti-contamination layer 5 are further formed on the surface of the outermost metallic oxide film 2D, and a transparent adhesive layer is formed on the back surface of t he transparent film base 1.

Figure 2:
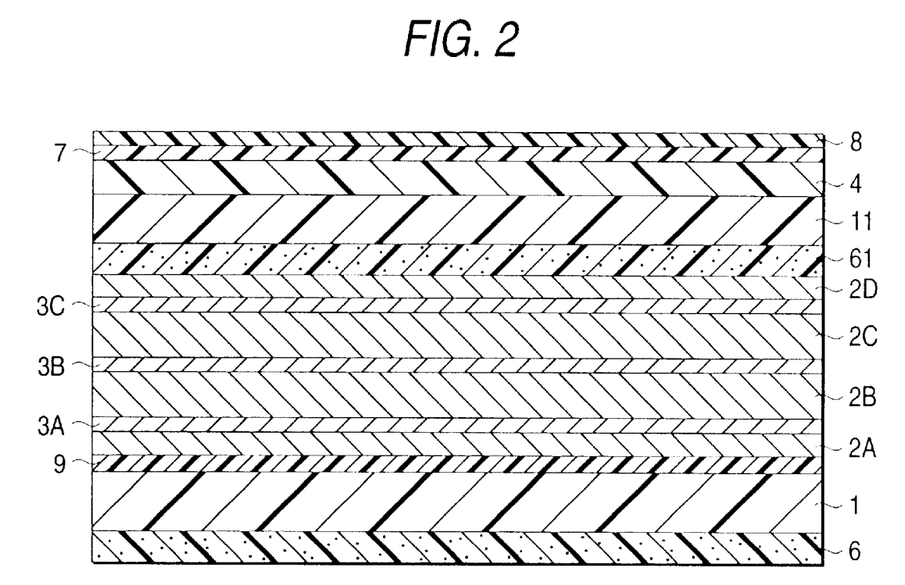
FIG. 2 is a sectional view showing an outline of another embodiment of a plasma display panel filter according to the present invention.

FIG. 2 (where the same constituent elements as those in FIG. 1 are referenced correspondingly) illustrates another embodiment, showing an example of the PDP filter in which an undercoat layer 9 with a refractive index of 1.5 or less and a thickness of 0.05 to 1 μm is formed between the surface of the transparent film base 1 and the metallic oxide film 2A provided on the surface thereof, while a film in which a hard coat layer 4, an anti-reflection layer 7 and an anti-contamination layer 8 are successively formed on one side of another transparent film base 11 is prepared, and the film is stuck to the surface of the outermost metallic oxide film 2D through a transparent adhesive layer 61 formed on the other side of the base 11.

As the transparent film base used in the present invention, one having transparency in the visible light range is available if its surface is smooth to some extent. For example, polyethylene terephthalate, triacetyl cellulose, polyethylene naphthalate, polyether sulfone, polycarbonate, polyarylate, polyether ether ketone, etc. are preferable. Although there is no limit in thickness of the film base unless any problem such as thermal wrinkles or the like occurs in the drying process, a film base having a thickness of 10 to 250 μm is usually used.

In addition, although a polymeric film may be used as it is without any treatment, as the film base, it may be subject to a hard coating treatment for giving mar-proof property to its one or both sides. The treatment may be of the UV-curing type or of the thermosetting type, and the thickness is preferably in a range of from 1 to 10 μm. The mar-proof effect is lowered if the thickness is less than 1 μm. On the other hand, a crack is apt to appear if the thickness exceeds 10 μm. Further, pigment for adjusting the color of visible light may be mixed into the film base, or coated on the film base.

Examples of the transparent molded body are transparent plastic plates of acrylic resin such as poly methyl methacrylate, polycarbonate resin, ABS resin, etc., and glass plates. However, the molded body is not limited particularly to those mentioned above, so long as it has a transparency, a certain measure of mechanical strength and heat resistance. The thickness thereof is in a range of from 1 to 10 mm, preferably from 2 to 5 mm.

In addition, pigment for adjusting the color of visible light may be mixed into the inside of the transparent molded body, or coated on the surface thereof. Further, a hard coat layer, an anti-reflection layer, an anti-glare layer and so on may be formed directly on the PDP-side surface of the transparent molded body, or a transparent film base of which these layers are once formed may be stuck to the PDP-side surface.

As the material for the metallic oxide films, optical film materials having high refractive index can be used to some extent. Preferably, the refractive index of the thin films is in a range of from 1.5 to 2.7. If the refractive index is less than 1.5, it is necessary to increase the thickness of the metallic oxide films, with the result that cracks are apt to appear when the metallic oxide films are multilayered. On the other hand, if the refractive index is beyond 2.7, the difference in refractive index between the outermost metallic oxide film and the air becomes too great to suppress the visible light reflectance to a low value. In addition, a single metallic oxide or a mixture of metallic oxides may be available. Further, more preferable is a material which has an effect to prevent migration of silver, or an effect of barrier to water and oxygen.

Preferable examples of the metallic oxide materials are oxide which has indium oxide as the main ingredient and contains a small amount of titanium dioxide, tin oxide, cerium oxide; titanium dioxide; zirconium oxide; bismuth oxide; niobium pentoxide; zinc oxide; etc. These thin film layers can be provided in a vacuum dry process such as sputtering, vacuum deposition, ion plating, or the like. The thickness of the metallic oxide films is preferably within a range of from 18 to 100 nm, and the film thickness providing the optimum optical properties is decided by the refractive index thereof, the thickness of the silver transparent electric-conductor films, the total number of layers, and so on.

The material of the silver transparent electric-conductor films consists of silver of 90 weight % or more and one or more elements selected from gold, copper, palladium, platinum, manganese, and cadmium. It is preferable to use a material containing a solid solution of silver of 90 to 99 weight % and the above-mentioned metals of 1 to 10 weight % in view of preventing silver from deterioration. If gold mixed therein is not less than 10 weight %, the specific resistance increases so that it is difficult to obtain a low resistance value. On the other hand, if gold is not more 1 weight %, silver is apt to deteriorate. As the means for forming the silver transparent electric-conductor films, a vacuum dry process such as sputtering or the like is used. The thickness of the silver transparent electric-conductor films is preferably in a range of from 5 to 20 nm, and more preferably in a range of from 9 to 17 nm.

The present inventors established target values of properties to be provided in a PDP filter for simultaneously cutting electromagnetic waves as well as near infrared rays generated from a PDP, as shown in the following Table 1, and promoted research and development earnestly.

TABLE 1

Target Properties of PDP Filter

| Item | Target Properties |
|---|---|
| Surface Resistance Value | 2 Ω/□ or less |
| Visible Light Transmission at 550 nm | 40% or more |
| IR Cut Ratio at 850–1200 nm | 95% or more |
| Visible Light Reflectance at 550 nm | 3% or less |

In spite of these target properties, various composite materials have been considered conventionally, as described in the paragraphs with respect to the background art. Most of the materials are however low in visible light transmission or low in reflection properties, or involve production of cracks or the like, or are less in reliability. In addition, if the configuration is made complicated in order to satisfy the required properties, it becomes expensive inevitably.

The present inventors repeated earnest examination on means for satisfying such required properties in a dry process on a transparent film base with a comparatively simple laminated configuration. As a result, surprisingly, the present inventors have found that a filter which does not require an IR absorbent and which is superior in optical properties while having a low resistance value can be attained in a comparatively simple laminated configuration when the following conditions are satisfied by a laminated body in which a metallic oxide film, a silver transparent electric-conductor film, a metallic oxide film, a silver transparent electric-conductor film, and a metallic oxide film are laminated successively and alternately in multi-layers on a transparent film base, that is, a laminated body expressed by the expression of transparent film base/(metallic oxide film/silver transparent electric-conductor film)n/metallic oxide film.

(1) Each of the metallic oxide films is made to be a film having optical transparency with a refractive index not less than 1.5 and not more than 2.7.

(2) The thickness of each silver transparent electric-conductor film is set substantially to a fixed value in a range of from 5 to 20 nm.

(3) n (positive number) is selected in a range satisfying $3 \leq n \leq 10$.

(4) Each of the thickness of the metallic oxide film on the film base surface and the thickness of the outermost metallic oxide film is set to be 5/2 (1±0.15) times as large as the thickness of the silver transparent electric-conductor films.

(5) The thickness of the metallic oxide films located halfway between the metallic oxide films stated in the above paragraph (4) is set to be 5 (1±0.15) times as large as the thickness of the silver transparent. electric-conductor films.

For example, when n=3 (see FIG. 1), the laminated body has a lamination of a transparent film base 1/a metallic oxide film 2A/silver transparent electric-conductor film 3A/the same 2B/the same 3B/the same 2C/the same 3C/a metallic oxide film 2D. In this case, if the silver transparent electric-conductor films (3A, 3B and 3C) are set to be 13 nm thick, the metallic oxide films (2A and 2D) are 32.5 nm thick, and the metallic oxide films (2B and 2C) are 65 nm thick. Then the optical properties in Table 1 can be satisfied.

Similarly to the above case, when n=4, the laminated body has a lamination of 1/2A/3A/2B/3B/2C/3C/2D/3D/2E. In this case, if the silver transparent electric-conductor films (3A, 3B, 3C and 3D) are set to be 12 nm thick, the metallic oxide films (2A and 2E) are 30 nm thick, and the metallic oxide films (2B, 2C and 2D) are 60 nm thick.

Further, similarly to the above cases, when n=5, if silver transparent electric-conductor films (3A to 3E) are set to be 11 nm thick, metallic oxide films (2A and 2F) are 27.5 nm thick, and metallic oxide films (2B, 2C, 2D and 2E) are 55 nm thick.

In the above description, the tolerance between 5/2 times and 5 times which are setting conditions for the thickness of metallic oxide films depends on the refractive index of the metallic oxide films.

In addition, in the case where the thickness of the silver transparent electric-conductor films is set to be not less than 5 nm and less than 11 nm, it will go well if they are made into multi-layers within a range of n=6 to 10. In the case where the thickness of the silver transparent electric-conductor films is set to be 14 to 20 nm, the optimum refractive index and the thickness of metallic oxide films are set under the condition of $n \geq 23$.

In the case of n<3, the surface resistance value can be reduced by increasing the thickness of each silver transparent electric-conductor film, while the optical properties cannot be satisfied. On the other hand, in the case of n>10, there are combinations satisfying the properties in Table 1, but the configuration itself becomes complicated, so that the objects of the present invention cannot be attained in a comparatively simple configuration which is intended by the invention.

The hard coat layer 4 is formed in order to prevent the laminated body from being injured, because the laminated body is stuck directly to the PDP front display portion and there is therefore a high possibility that a human may touch the laminated body. When the refractive index of the hard coat layer is 1.45 or less, the property of surface hard coat can be given without reducing the optical properties, particularly without reducing the reflection properties from the innermost metallic oxide film to the outermost metallic oxide film. In addition, preferably the hard coat layer has an angle of contact with water of 90° or more because the hard coat layer can also has an anti-contamination property. The film thickness is preferably in a range of from 0.05 to 10 μm, more preferably in a range of from 0.1 to 6 μm.

As the hard coat materials having a refractive index of 1.45 or less, thermosetting-type $SiO_2$ materials, UV-curing-type fluoro polymer materials, etc. are preferable in hardness, but the hard coat materials are not limited thereto. In this case, an anti-reflection and anti-contamination layer 5 may be formed though it is not required to be formed.

When the refractive index of the hard coat layer exceeds 1.45, optical properties, particularly reflection properties deteriorate from the innermost metallic oxide film to the outermost metallic oxide film, but materials with a high refractivity are suitable for improving the surface hardness. In order to obtain enough surface hardness while giving loss in reflection properties as small as possible, the thickness is preferably set to be in a range of from 0.05 to 10 $\mu$m, more preferably from 0.1 to 6 $\mu$m. An anti-reflection and anti-contamination layer 5 may be formed on this surface in order to improve the reflection properties. As for the anti-reflection and anti-contamination material, an optical film of low-refractive fluororesin, $MgF_2$, $CaF_2$ or the like may be formed in a dry process such as a coating method, a sputtering method or the like. The thickness of the optical film is preferably set to be in a range of from about 0.001 to 1 $\mu$m.

Instead of forming a hard coat layer directly on the surface of the outermost metallic oxide film, as shown in FIG. 2, a film in which a hard coat layer 4, an anti-reflection layer 7 and an anti-contamination layer 8 are formed on one side of another transparent film base 11 is prepared, and the film is stuck to the surface of the outermost metallic oxide film through a transparent adhesive layer 61 formed on the other side of the base 11.

In this case, any material, if it can be used as the transparent film base 1, may be used as the transparent film base 11 without limitation. Usually, polyester film or tri-acetyl cellulose film is used. For the hard coat layer, a high hard coat agent is generally used, and it is preferable to use a material selected from UV-curing-type acryl urethane derivatives, thermosetting-type siloxane derivatives, or the like, and with a thickness in a range of from about 1 to 10 m. The anti-reflection layer and the anti-contamination layer may be replaced by one layer formed of a material having both the above-mentioned anti-reflection property and anti-contamination property. A material of water-repellent fluororesin, $MoS_2$ or the like may be subjected to a dry process such as a thin layer coating process, a sputtering process or the like, so as to form an anti-contamination layer on an anti-reflection layer constituted by a multilayer film of a high-refractive film and a low-refractive film formed by a method such as sputtering deposition or the like.

In addition, when an undercoat layer 9 with a refractive index of 1.5 or less and a thickness of 0.05 to 1 $\mu$m is formed between the surface of the transparent film base and the innermost metallic oxide film, there are an effect that the adhesion between the metallic oxide film and the film base can be improved, and an effect that the visible light reflectance of the laminated body as a whole is further reduced. As the material of the undercoat layer, UV-curing-type low-refractive fluoro polymer to which a functional group is introduced to improve the adhesion, UV-curing-type low-refractive inorganic coat material, etc. are available.

As for the transparent adhesive layer 6, the elastic modulus is preferably in a range of from $1 \times 10E^5$ to $1 \times 10E^7$ dyn/$cm^2$, and the thickness is preferably in a range of from 10 to 500 $\mu$m, more preferably from 25 to 300 $\mu$m. Examples of materials thereof include acrylic adhesive, rubber adhesive, polyester adhesive, etc. Particularly it is preferable to use an acrylic adhesive. To prepare the acrylic adhesive, one or more kinds of (meth)acrylate alkyl esters having a glass transition point not higher than $-10°$ C. after being polymerized, as principal monomers for giving moderate wettability and plasticity as an adhesive, and in accordance with necessity functional-group containing monomers such as acrylic acid, methacrylic acid, 2-hydroxyethyl acrylate, and so on, and other copolymerizable monomers are polymerized in a process such as a solution polymerization process, an emulsion polymerization process, a self-polymerization process (particularly a polymerization process by using ultraviolet rays), a suspension polymerization process, etc., by using a suitable polymerization catalyst. To the acrylic polymer obtained in such a manner, various additives such as a crosslinker and so on are added. The acrylic polymer may be of a thermo crosslinkable type, a photo (ultraviolet rays or electron rays) crosslinkable type, or the like.

If the transparent adhesive layer having the above-mentioned properties is used, a swell in the PDP glass surface is absorbed so as to improve the sticking while the film is stuck directly to the PDP front display glass. In addition, even if a foreign matter from the outside collides against this adhesive layer area after the film is stuck, not only it is difficult to damage the film surface because of a cushion effect of the adhesive layer, but also it is possible to obtain such a property that the adhesive thickness is reduced for a moment, the adhesive restores itself before long so that the film recovers its original smooth surface as if nothing had happened.

Next, the present invention will be specifically described by way of example, but the present invention is not limited to such examples.

EXAMPLE 1

UV-curing-type hard coat resin (having as its main ingredient, the trade name UNIDIC 17-813 made by DAIN-IPPON INK AND CHEMICALS, INCORPORATED) was applied to be 5 $\mu$m thick on one side of a transparent polyethylene terephthalate (PET) film 125 $\mu$m thick. By using the transparent film base to which mar-proof was given in the above manner, thin films were formed successively on the hard coat (HC) side in the order of a metallic oxide film, a silver transparent electric-conductor film, and a metallic oxide film, in a DC magnetron sputtering process.

The visible light transmission at 550 nm of the transparent film base with the HC was 89%. $In_2O_3$-12.6 weight % $TiO_2$ was used as target material for forming the metallic oxide films, and Ag-5 weight % Au was used as target material for forming the silver transparent electric-conductor films. The film thickness was measured by a working curve of film-forming speed by using a surface roughness tester (DEKTAK3) and precision measurement by using a transmission-type electron microscope, upon each film attached to a thick film. To measure resistance values, a tester (Lorester SP) made by MITSUBISHI PETROCHEMICAL CO., LTD. was used. In addition, optical properties were measured by using U-3410 made by HITACHI, LTD.

Three kinds of laminated body samples (1), (2) and (3) were produced, in which n units (n=3, 4, 5) were successively laminated to the following thickness on the HC of the above-mentioned transparent film base when every unit is constituted by a metallic oxide film and a silver transparent electric-conductor film, and a metallic oxide film was formed in the outermost layer.

(1) 32.5/13/65/13/65/13/32.5 (nm)
(2) 28.5/11.5/57.5/11.5/57.5/11.5/57.5/11.5/28.5 (nm)
(3) 26.0/10.5/52.5/10.5/52.5/10.5/52.5/10.5/52.5/10.5/26.0 (nm)

The filter properties of the produced samples are shown in Table 2.

TABLE 2

| | Filter Properties of Samples | | |
|---|---|---|---|
| Property Item | Sample (1) | Sample (2) | Sample (3) |
| Surface Resistance Value ($\Omega/\square$) | 2.0 | 2.0 | 1.9 |
| Visible Light Transmission at 550 nm, (%) | 73 | 73 | 73 |
| IR Cut Ratio at 850–1200 nm, (%) | 95 or more | 96 or more | 97 or more |
| Visible Light Reflectance at 550 nm, (%) | 3 | 2 | 2 |

Figure 3:
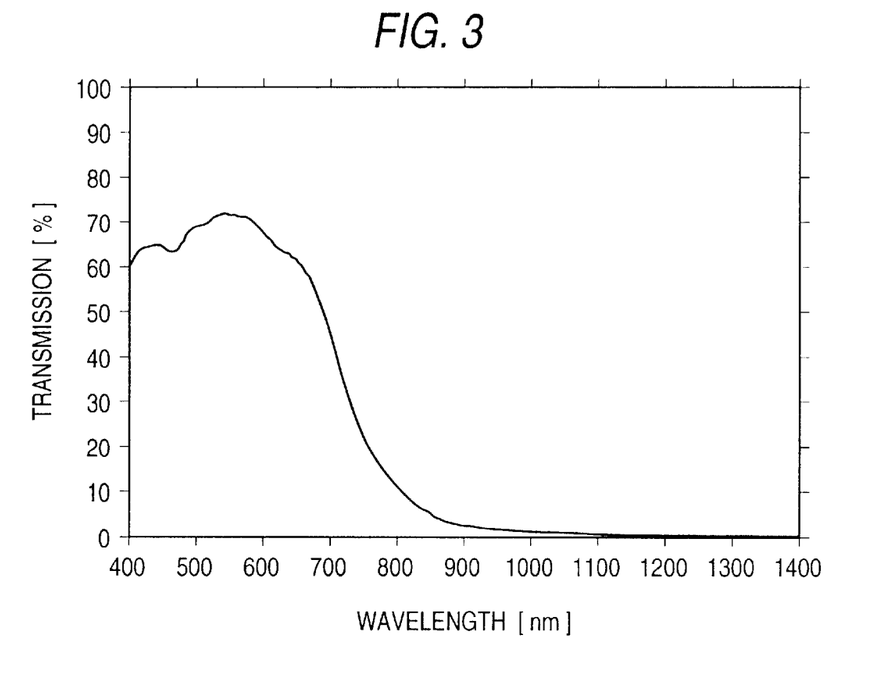
FIG. 3 is an optical measurement chart showing the light transmission of a filter obtained in Example 1 of the present invention.
Figure 4:
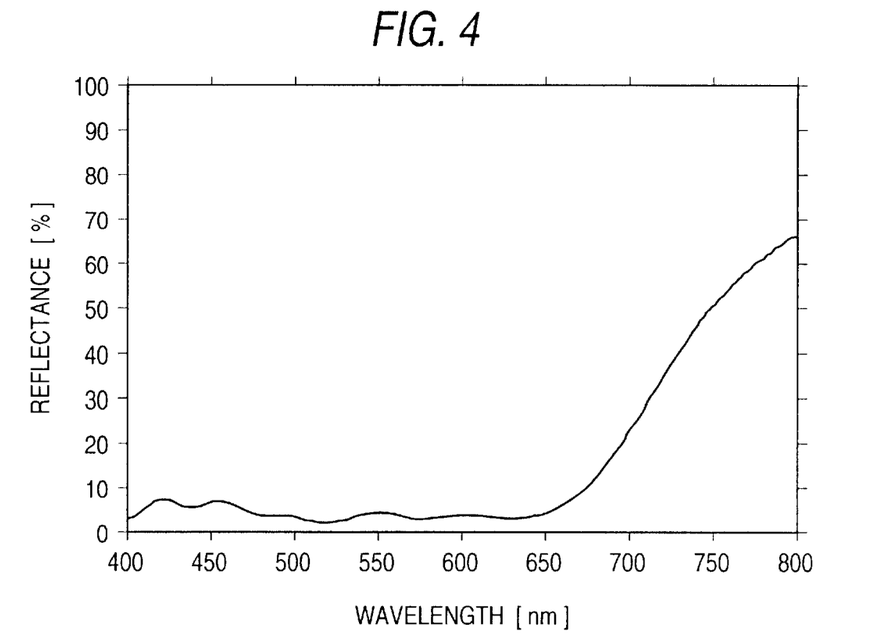
FIG. 4 is an optical measurement chart showing the light reflectance of the filter obtained in Example 1 of the present invention.

In addition, optical measurement charts about the sample (1) of the produced filters are shown in FIGS. 3 and 4. According to FIG. 3, it is seen that high transmission could be obtained in the visible light area, and most of near infrared rays not less than 800 nm were cut. According to FIG. 4, it is understood that reflectance was low all over the visible light area.

As is apparent from the above-mentioned Table 2 and FIGS. 3 and 4, it was possible to obtain a filter having superior optical properties of a low resistance value, IR cut, and so on, by a simple configuration of a sputter laminated film of 7 layer in total with n=3. In the case of n=4 and n=5, it was found that the properties were improved though the number of laminated layers increased.

Comparative Example 1

Although respective materials and a production method were similar to those in Example 1, the thickness of metallic oxide films was set to the following values which were departed from the scope of the present invention. Two kinds of laminated body samples (4) and (5) were produced thus, and evaluation was performed in the same manner as that in Example 1.
(4) 37.5/13/75/13/75/13/37.5 (nm)
(5) 32.5/13/75/13/75/13/32.5 (nm) The filter properties of the produced samples are shown in Table 3.

TABLE 3

| | Filter Properties of Samples | |
|---|---|---|
| Property Item | Sample (4) | Sample (5) |
| Surface Resistance Value ($\Omega/\square$) | 2.0 | 2.0 |
| Visible Light Transmission at 550 nm, (%) | 70 | 69 |
| IR Cut Ratio at 850–1200 nm, (%) | 88 | 83 |
| Visible Light Reflectance at 550 nm, (%) | 4 | 6 |

Figure 5:
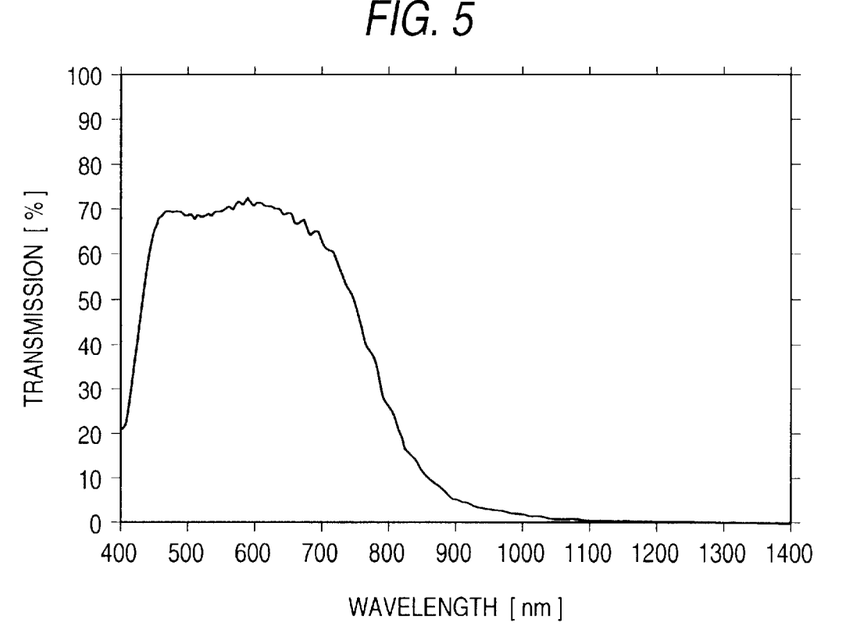
FIG. 5 is an optical measurement chart showing the light transmission of a filter obtained in Comparative 1.
Figure 6:
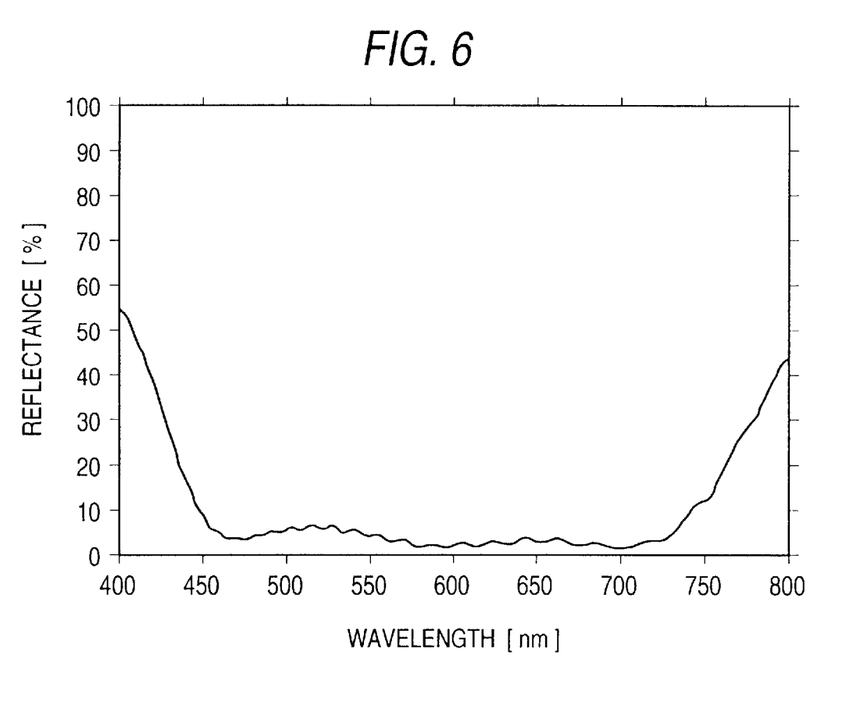
FIG. 6 is an optical measurement chart showing the light reflectance of the filter obtained in Comparative 1.

In addition, the optical measurement charts about the produced sample (4) are shown in FIGS. 5 and 6. According to FIG. 5, it is seen that the transmission of blue light deteriorates, and the cutting of near infrared rays not less than 800 nm are insufficient. In addition, according to FIG. 6, it is understood that the reflectance of blue is high.

As apparent from the above-mentioned Table 3 and FIGS. 5 and 6, it was impossible to obtain a filter satisfying both a low resistance value and optical properties by a simple lamination configuration of about 7 layers under the thickness balance of the metallic oxide films set to values departed from the scope of the present invention.

EXAMPLE 2

UV-curing-type low-refractive fluoro polymer (the trade name JM5010, made by NIPPON SYNTHETIC CHEMICAL INDUSTRY CO., LTD.) was applied by gravure coating onto an HC of a transparent PET film 125 $\mu$m thick similar to that in Example 1, and cured by ultraviolet irradiation at 300 mJ/cm$^2$ for 3 minutes, so that an undercoat layer 0.15 $\mu$m thick was formed. The refractive index of this layer was 1.41, and the material used therefor had no slipperiness in order to improve the adherence between the HC of the transparent film base and the metallic oxide film formed thereon.

By using materials and a manufacturing method similar to those in Example 1, laminated bodies were produced, in which n units (n=3) were successively laminated to the following thickness on this undercoat layer such that every unit was constituted by a metallic oxide film and a silver transparent electric-conductor film, and a metallic oxide film was formed in the outermost layer.

Thickness of each film: 32.5/13/65/13/65/13/32.5 (nm)

Next, an SiO$_2$ hard coat material (the trade name LR201, made by NISSAN CHEMICAL INDUSTRIES, LTD.) with a refractive index of 1.36 was formed as a hard coat layer on the above-mentioned outermost metallic oxide film by gravure coating, and thereafter cured at 150° C. for 5 minutes. The thus obtained hard coat layer was 5 $\mu$m thick, and the angle of contact with water was 104 degrees.

Further, acrylic adhesive solution with a solids content of 20 weight % was coated on the back surface of the above-mentioned transparent film base, and dried at 150° C. for 5 minutes, thereby forming a transparent adhesive layer with a thickness of 50 $\mu$m and an elasticity modulus of 1.8×10E$^6$dyn/cm$^2$. A laminated body sample (6) was produced thus.

This sample (6) and another sample in which the same sample (6) was stuck to a PDP front display glass portion by a roll laminator were prepared as evaluation samples. The results of evaluation are shown in Table 4. As is apparent from Table 4, the sample (6) provided superior results in electromagnetic wave shield properties, near infrared ray cut properties, and low visible light reflection properties, and it was possible to obtain a PDP front filter superior in mar-proof, superior in visibility, and having both thinness and lightness in weight.

EXAMPLE 3

An undercoat layer 0.15 $\mu$m thick similar to that in Example 1 was formed on one side of a transparent PET film 125 $\mu$m thick. A laminated body was obtained in the same manner as that in Example 1, except that on this undercoat layer, In$_2$O$_3$-10 weight % SnO$_2$ was used as target material for forming metallic oxide films, and Ag-3 weight % Au was used as target material for forming silver transparent electric-conductor films. Then the refractive index of In$_2$O$_3$-10 weight % SnO$_2$ was 2.0.

As for the thickness of each film formed on the above-mentioned undercoat layer and constituting the laminated body, each silver transparent electric-conductor film was set to be 12 nm thick, and each of the innermost and outermost metallic oxide films was set to be 34.4 nm thick, while each of the other metallic oxide films located halfway was set to be 68.8 nm thick (n=3). Next, UV-curing-type hard coat (having as its main ingredient, the trade name UNIDIC 17-813, made by. DAINIPPON INK AND CHEMICALS, INCORPORATED) with a refractive index of 1.55 was applied onto the outermost metallic oxide film in a fountain reverse process, and solidified by ultraviolet irradiation at 300 mJ/cm$^2$ for 3 minutes, so as to form a hard coat layer 5 µm thick. Further, an organic fluoride anti-reflection and anti-contamination material (the trade name JM5025, made by NIPPON SYNTHETIC CHEMICAL INDUSTRY CO., LTD.) was applied onto the hard coat layer by gravure coating, and irradiated by ultraviolet rays at 300 mJ/cm$^2$ for 3 minutes so as to form an anti-reflection and anti-contamination layer 0.15 µm thick.

On the other hand, acrylic adhesive solution with a solids content of 20 weight % was coated on the back surface of the above-mentioned transparent film base, and dried at 150° C. for 5 minutes, thereby forming a transparent adhesive layer with a thickness of 100 µm and an elasticity modulus of $1.0 \times 10E^6$ dyn/cm$^2$. A laminated body sample (7) was produced thus.

This sample (7) and another sample in which the sample (7) was stuck to a PDP front display glass portion by a roll laminator were prepared as evaluation samples. The results of evaluation are shown in Table 4. As is apparent from Table 4, the sample (7) provided superior results in electromagnetic wave shield properties, near infrared ray cut properties, and low visible light reflection properties, and it was possible to obtain a PDP front filter superior in mar-proof, superior in visibility, and having both thinness and lightness in weight.

TABLE 4

Filter Properties

| Evaluated Form | Property Item | Example 2 | Example 3 |
|---|---|---|---|
| Laminated Body | Surface Resistance value (Ω/□) | 2.0 | 1.9 |
| | Visible Light Transmission at 550 nm, (%) | 73 | 71 |
| | IR Cut Ratio at 850–1200 nm, (%) | 95 | 97 |
| | Visible Light Reflectance at 550 nm, (%) | 3.0 | 3.0 |
| Stuck to PDP. | Surface Pencil Hardness | 2H | 3H |
| | Steel Wool Test (Product No. #0000, 250 g/cm$^2$ × 10 times) | No Surface Mark | As Left |
| | Visibility | Superior display with less double Reflectance and less angle variation could be confirmed. | As Left |

EXAMPLE 4

An undercoat layer 0.15 µm thick similar to that in Example 2 was formed on one side of a transparent PET film 125 µm thick.

By the same production method as that in Example 1, a laminated body was produced, in which n units (n=3) were successively laminated to the following thickness on this undercoat layer when every unit is constituted by a metallic oxide film and a silver transparent electric-conductor film, and a metallic oxide film was formed in the outermost layer. Thickness of each film: 32.5/13/65/13/65/13/32.5 (nm)

Next, a triacetyl cellulose (TAC) film base 80 µm thick was prepared. UV-curing-type HC resin (having as its main ingredient, the trade name UNIDIC 15-829, made by DAINIPPON INK AND CHEMICALS, INCORPORATED) was applied to a thickness of 5 µm onto one side of the film base. After that, a silicon resin layer (the trade name LR201, made by NISSAN CHEMICAL INDUSTRIES, LTD.) with a refractive index of 1.36 having anti-reflection properties and anti-contamination properties was applied to a thickness of 0.2 µm onto the HC resin layer. The angle of contact with water of this anti-reflection and anti-contamination layer was 104 degrees.

A transparent adhesive layer 23 µm thick was formed on the back surface of the above-mentioned one-side-treated TAC film. The film was stuck to the surface of the outermost metallic oxide film of the laminated body. Further, acrylic adhesive solution with a solids content of 20 weight % was coated on the back surface of the above-mentioned PET base, and dried at 150° C. for 5 minutes, thereby forming a transparent adhesive layer with a thickness of 100 µm and an elasticity modulus of $1.0 \times 10E^6$ dyn/cm$^2$. A laminated body sample (8) was produced thus.

This sample (8) and another sample in which the sample (8) was stuck to a PDP front display glass portion by a roll laminator were prepared as evaluation samples. The results of evaluation are shown in Table 5. As is apparent from Table 5, the sample (8) provided superior results in electromagnetic wave shield properties, near infrared ray cut properties, and low visible light reflection properties, and it was possible to obtain a PDD front filter superior in mar-proof, superior in visibility, and having both thinness and lightness in weight.

TABLE 5

Filter Properties

| Evaluated Form | Property Item | Example 4 |
|---|---|---|
| Laminated Body | Surface Resistance Value (Ω/□) | 2.0 |
| | Visible Light Transmission at 550 nm, (%) | 74 |
| | IR Cut Ratio at 850–1200 nm, (%) | 95 |
| | Visible Light Reflectance at 550 nm, (%) | 2.0 |
| Stuck to PDP | Surface Pencil Hardness | 3H |
| | Steel Wool Test (Product No.#0000, 250 g/cm$^2$ × 10 times) | No Surface Mark |
| | Visibility | Superior display with less double reflectance and less angle variation could be confirmed. |

EXAMPLE 5

The laminated body sample (7) produced in Example 3 was stuck to one side of a transparent acrylic sheet (the trade name ACRYLITE, made by MITSUBISHI RAYON CO. LTD.), and the back surface of a PET film 125 µm thick coated with an anti-glare layer having a Haze value of 3% was stuck to the other side of the transparent acrylic sheet through a transparent adhesive. The sheet obtained thus was prepared as an evaluation sample of a PDP front filter sheet.

The evaluation results of the above-mentioned evaluation sample are shown in Table 6. As is apparent from Table 6, also in the case where the laminated body sample was stuck to the transparent acrylic sheet, it was possible to obtain a PDP front filter sheet superior in mar-proof, low in resistance and superior in optical properties.

TABLE 6

Filter Properties

| Property Item | Example 5 |
|---|---|
| Surface Resistance Value ($\Omega/\square$) | 1.9 |
| Visible Light Transmission at 550 nm, (%) | 60 |
| IR Cut Ratio at 850–1200 nm, (%) | 97 |
| Surface Pencil Hardness | 3H |
| Steel Wool Test (Product No. #0000, 250 g/cm$^2$ × 10 times) | No Surface Mark |
| Visibility | Double Reflection Exists |

By setting the mutual thickness relationship, into specific numeral values, between metallic oxide films and silver transparent electric-conductor films constituting a laminated body in a PDP filter according to the present invention, it is possible to provide a filter which satisfies properties necessary for a PDP such as electromagnetic wave shielding properties, near infrared ray cut properties, low visible light reflection properties, and so on, at the same time in a comparatively simple laminated configuration, and which is superior in visibility, light in weight and thin. In addition, according to the present invention, it is also possible to provide a PDP display unit which is provided with this PDP filter and which is superior in optical properties.

While the presently preferred embodiment of the present invention has been shown and described, it is to be understood that the disclosure is for the purpose of illustration and that various changes and modification may be made without departing from the scope of the invention as set forth in the appended claims.

What is claimed is:

1. A filter for a plasma display panel comprising:

a transparent film base;

a first metallic oxide film laminated on said transparent film base;

a silver transparent electric-conductor film laminated on said transparent, wherein a laminate unit of said first metallic oxide film and said silver transparent electric-conductor film is successively laminated unit by unit in a number of n units ($3 \leq n \leq 10$); and a second metallic oxide film formed on a plurality of said laminate units with the number of n;

wherein each metallic oxide film has optical transparency of a refractive index of 1.5 to 2.7, and each silver transparent electric-conductor film has a thickness set substantially to a fixed value in a range of from 5 to 20 nm, and wherein one of said first metallic oxide films put directly on the surface of said transparent film base and said second metallic oxide film respectively has a thickness 5/2 (1±0.15) times as large as the thickness of said silver transparent electric-conductor film, and each of other said first metallic oxide films located halfway between said one first metallic oxide film put directly on the surface of said transparent film base and said second metallic oxide film respectively has a thickness 5 (1±0.15) times as large as the thickness of said silver transparent electric-conductor film.

2. A plasma display panel filter according to claim 1, wherein said metallic oxide film comprises at least one of selected from a group consisting of indium oxide, tin oxide, titanium dioxide, cerium oxide, zirconium oxide, zinc oxide, tantalum oxide, and niobium pentoxide.

3. A filter for a plasma display panel according to claim 1, wherein said silver transparent electric-conductor film comprises: silver of 90 or more weight %; and at least one of selected from a group consisting of gold, copper, palladium, platinum, manganese, and cadmium.

4. A filter for a plasma display panel according to claim 1, further comprising a hard coat layer formed on a surface of said second metallic oxide film.

5. A filter for a plasma display panel according to claim 4, wherein said hard coat layer has a refractive index of 1.45 or less, a thickness in a range of from 0.05 to 10 μm, and an angle of contact with water of 90° or more.

6. A filter for a plasma display panel according to claim 4, further comprising an anti-reflection and anti-contamination layer having a thickness in a range of from 0.01 to 1 μm formed on a surface of said hard coat layer.

7. A filter for a plasma display panel according to claim 1, further comprising a laminate of another transparent film base, an anti-reflection layer and an anti-contamination layer being stuck to a surface of said second metallic oxide film through a transparent adhesive layer formed on a surface of said another transparent film base.

8. A filter for a plasma display panel according to claim 1, further comprising an undercoat layer with a refractive index of 1.5 or less and a thickness in a range of from 0.05 to 1 μm formed between the surface of said transparent film base and said first metallic oxide film provided on the surface of said transparent film base.

9. A filter for a plasma display panel according to claim 1, further comprising a transparent adhesive layer having a thickness in a range of from 10 to 500 μm formed on a back surface of said transparent film base.

10. A plasma display panel display unit comprising:

a plasma display panel having a front display glass portion;

a transparent adhesive layer; and a filter stuck on said front display glass portion of said plasma display panel through said transparent adhesive layer, said filter comprising:

a transparent film base;

a first metallic oxide film laminated on said transparent film base;

a silver transparent electric-conductor film laminated on said transparent, wherein a laminate unit of said first metallic oxide film and said silver transparent electric-conductor film is successively laminated unit by unit in a number of n units ($3 \leq n \leq 10$); and a second metallic oxide film formed on a plurality of said laminate units with the number of n;

wherein each metallic oxide film has optical transparency of a refractive index of 1.5 to 2.7, and each silver transparent electric-conductor film has a thickness set substantially to a fixed value in a range of from 5 to 20 nm, and wherein one of said first metallic oxide films put directly on the surface of said transparent film base and said second metallic oxide film respectively has a thickness 5/2 (1±0.15) times as large as the thickness of said silver transparent electric-conductor film, and each of other said first metallic oxide films located halfway between said one first metallic oxide film put directly on the surface of said transparent film base and said second metallic oxide film respectively has a thickness 5 (1±0.15) times as large as the thickness of said silver transparent electric-conductor film.

11. A plasma display panel display unit comprising:

a plasma display panel;

a transparent molded body being attached on a surface of said plasma display panel through an air layer;

a transparent adhesive layer; and a filter stuck through said transparent adhesive layer, onto a second surface of said transparent molded body being opposite to a first surface of said transparent molded body on which said plasma display unit is attached, said filter comprising:

a transparent film base;

a first metallic oxide film laminated on said transparent film base;

a silver transparent electric-conductor film laminated on said transparent, wherein a laminate unit of said first metallic oxide film and said silver transparent electric-conductor film is successively laminated unit by unit in a number of n units (3≦n≦10); and a second metallic oxide film formed on a plurality of said laminate units with the number of n;

wherein each metallic oxide film has optical transparency of a refractive index of 1.5 to 2.7, and each silver transparent electric-conductor film has a thickness set substantially to a fixed value in a range of from 5 to 20 nm, and wherein one of said first metallic oxide films put directly on the surface of said transparent film base and said second metallic oxide film respectively has a thickness 5/2 (1±0.15) times as large as the thickness of said silver transparent electric-conductor film, and each of other said first metallic oxide films located halfway between said one first metallic oxide film put directly on the surface of said transparent film base and said second metallic oxide film respectively has a thickness 5 (1±0.15) times as large as the thickness of said silver transparent electric-conductor film.

* * * * *